United States Patent [19]
Jackson

[11] 3,975,229
[45] Aug. 17, 1976

[54] FLAMELESS REBOILER FOR RECONCENTRATING LIQUID DESICCANT

[76] Inventor: Morden A. Jackson, 1764 E. 60th Place, Tulsa, Okla. 74105

[22] Filed: Jan. 10, 1972

[21] Appl. No.: 216,831

Related U.S. Application Data

[63] Continuation of Ser. No. 10,900, Feb. 12, 1970, abandoned.

[52] U.S. Cl. .................... 159/31; 55/32; 159/28 R; 122/7 R
[51] Int. Cl.² .................. B01D 1/00; F22D 1/00; B01D 53/02
[58] Field of Search ............... 159/14, 27, 28, 31, 159/17 VS, 28 R, 29; 55/32; 62/496, 497; 122/7, 273, 367 C, 327, 343

[56] References Cited
UNITED STATES PATENTS

| | | | |
|---|---|---|---|
| 497,432 | 5/1893 | Seaburg | 122/273 |
| 896,434 | 8/1908 | Chute | 202/155 |
| 1,067,010 | 7/1913 | Dunn | 159/27 R X |
| 1,114,333 | 10/1914 | Bancel | 165/114 |
| 1,145,728 | 7/1915 | Wiegand | 159/18 |
| 1,148,832 | 8/1915 | Edison | 122/7 |
| 1,323,847 | 12/1919 | Dryen | 203/12 |
| 1,508,130 | 9/1924 | Sanger | 159/27 |
| 1,728,720 | 9/1929 | Breisig | 122/7 |
| 2,031,422 | 2/1936 | Malseed et al. | 122/7 |
| 2,163,303 | 6/1939 | Bonotto | 203/96 |
| 2,216,815 | 10/1940 | Hall | 159/17 VS X |
| 2,217,547 | 10/1940 | Hall | 159/17 VS X |
| 2,330,057 | 9/1943 | Honfer | 202/187 |
| 2,365,305 | 12/1944 | Stromquist | 122/7 |
| 2,372,992 | 4/1945 | Wallis et al. | 122/7 |
| 2,449,587 | 9/1948 | Chambers | 202/237 |
| 2,584,686 | 2/1952 | Fabia et al. | 122/7 |
| 2,615,311 | 10/1952 | McNeely et al. | 62/497 |
| 2,650,802 | 9/1953 | Huet | 122/367 C X |
| 3,105,748 | 10/1963 | Stahl | 55/32 |
| 3,147,742 | 9/1964 | May | 122/7 |
| 3,162,515 | 12/1964 | Connors et al. | 55/82 |
| 3,269,360 | 8/1966 | Adams | 122/7 |
| 3,302,705 | 2/1967 | Witten, Jr. | 122/367 C |
| 3,347,019 | 10/1967 | Barnhart | 55/32 |
| 3,351,537 | 11/1967 | Peterson | 202/172 |
| 3,372,677 | 3/1968 | Boyen | 122/7 |
| 3,397,731 | 8/1968 | Gravis et al. | 159/16 R |
| 3,451,897 | 6/1969 | Welch | 202/160 |

FOREIGN PATENTS OR APPLICATIONS

| | | | |
|---|---|---|---|
| 1,303,016 | 7/1962 | France | 122/343 |
| 71,271 | 10/1893 | Germany | 159/27 R |

*Primary Examiner*—Jack Sofer
*Attorney, Agent, or Firm*—Head, Johnson & Chafin

[57] ABSTRACT

An apparatus for flamelessly reconcentrating liquid desiccant includes upper and lower enclosed reboiler drums having an enclosed heating section interposed therebetween. Water-rich liquid desiccant is continuously recirculated between the upper and lower reboiler drums through riser conduits disposed within the heating section and return conduits exterior thereof. Simultaneously with the recirculation of the water-rich liquid desiccant an exhaust gas stream from a prime mover is passed through the heating section to convectionally heat the liquid desiccant within the riser conduits causing disengagement of water vapors therefrom. The upper drum includes an outlet for the disengaged water vapors and also an outlet for the resultant water-lean liquid desiccant.

4 Claims, 3 Drawing Figures

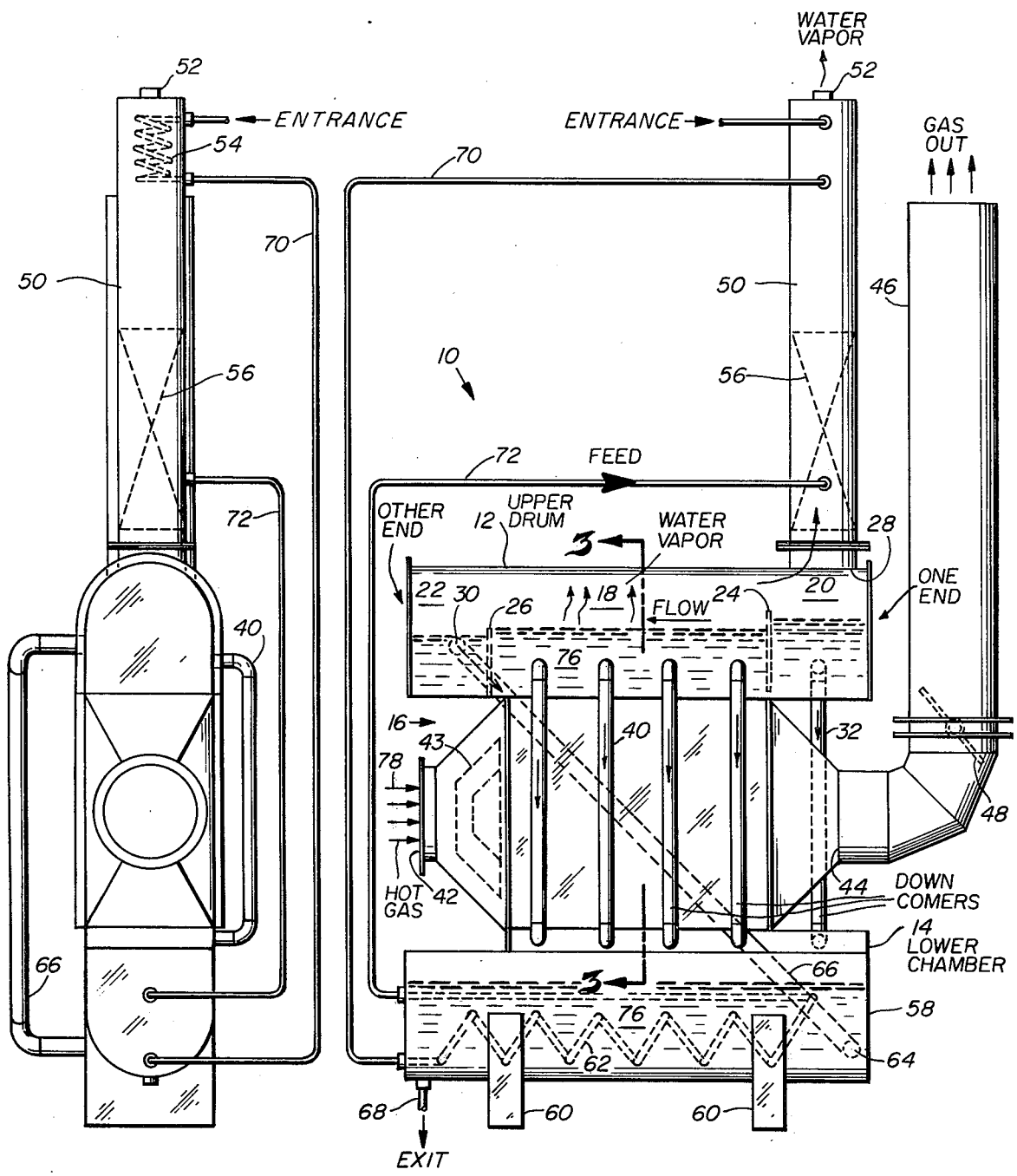

FLAMELESS REBOILER FOR RECONCENTRATING LIQUID DESICCANT

This is a continuation of Ser. No. 10,900, filed Feb. 12, 1970.

BACKGROUND OF THE INVENTION

Liquid desiccants such as diethylene glycol or triethylene glycol, which may be subsequently referred to simply as glycol, have been widely accepted and are presently being used for dehydrating natural gas streams. The dehydration occurs by the intimate mixing of the gas stream with the liquid desiccant and the removal of water from the gas stream because of the greater affinity of water for the glycol than the gas stream.

The resultant moisture laden or water-rich glycol then must be dehydrated itself. Presently this dehydration of the glycol is accomplished by heating or reboiling the liquid above its boiling point so that the water is driven off and water-lean glycol is collected to be recycled to the contact zone of the natural gas stream.

A fire tube having an open flame is usually utilized to heat the water-laden glycol. In many situations the use of an open flame presents a problem due to the fire danger inherent to the use thereof. One situation occurs on off-shore platforms which are many miles from any fire fighting equipment and hence requires that all fire hazards be reduced to a minimum.

Most gas gathering systems have included therein internal combustion type prime movers such as piston driven engines or gas fired turbines which utilize hydrocarbon fluids as fuel. All of these engines produce fairly high temperature exhaust gases, usually in the range from 700° to 1300° F. which when exhausted directly to atmosphere represent the loss of amount of recoverable energy in the form of heat. Such losses have heretofore been considered to be largely unavoidable and in only isolated instances have efforts been extended to recover this energy.

It is therefore an object of this invention to present a method and apparatus for flamelessly reconcentrating liquid desiccant through utilization of heat energy produced by an exhaust gas stream emanating from a prime mover.

SUMMARY OF THE INVENTION

Liquid desiccant is continually recirculated between enclosed upper and lower drums through riser and return conduits. The riser conduits are disposed within an enclosed heating section through which a stream of hot exhaust gases passes to convectionally heat the liquid desiccant within the riser conduits. Water vapor disengaged by the heating is removed through an outlet in the upper drum and the resultant water-lean desiccant is removed therefrom through a second outlet.

DESCRIPTION OF THE DRAWINGS

FIG. 1 is a side view of the apparatus of the invention.
FIG. 2 is an end view of the apparatus.

DETAILED DESCRIPTION OF THE PREFERRED EMBODIMENT

Figure 3:
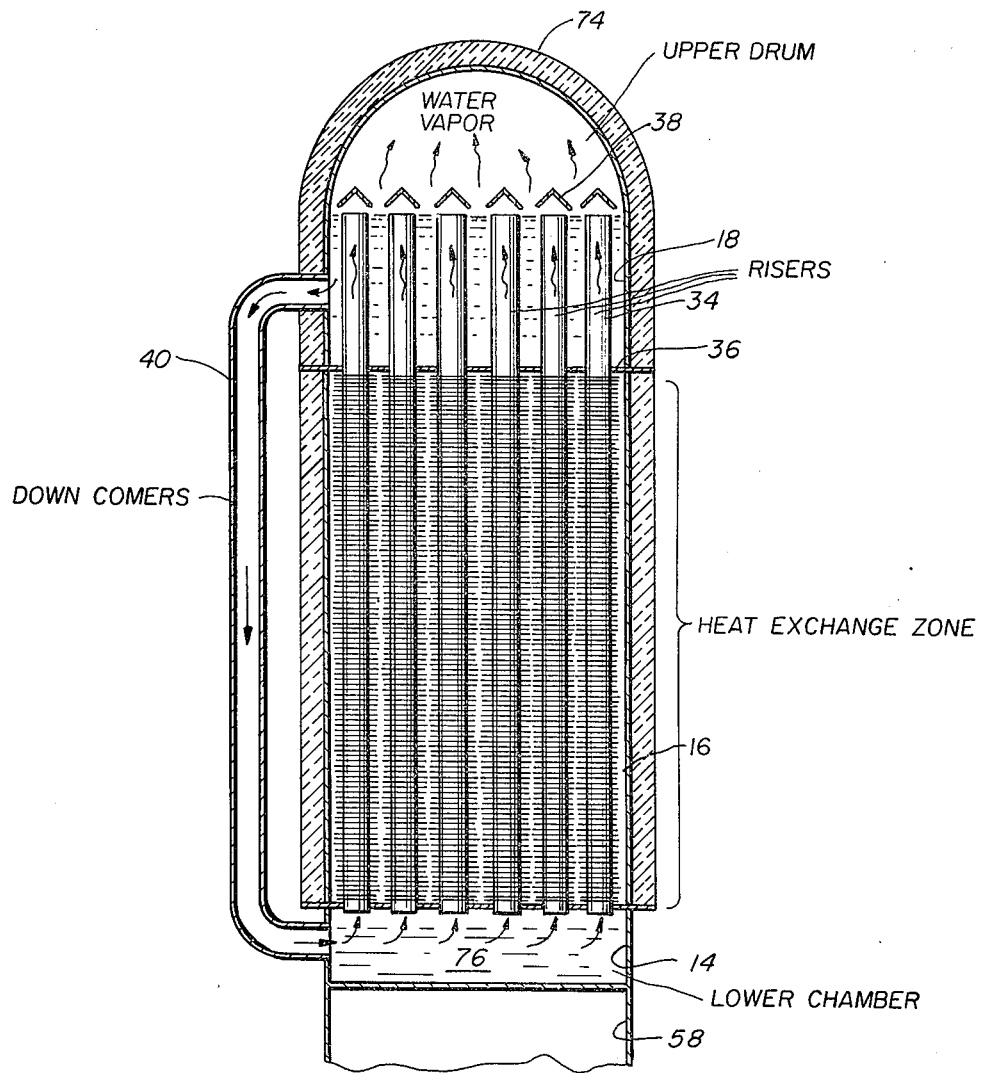
FIG. 3 is a cross-sectional view of the apparatus taken along line 3—3 of FIG. 1.

Looking now at FIG. 1 of the drawing, the apparatus of this invention comprises an enclosed vessel 10 having three main sections, an upper reboiler drum 12, a bottom drum 14, and an enclosed heating section 16 disposed therebetween.

Upper reboiler drum 12 is subdivided into a central chamber 18, a liquid-holding chamber 20, and a water-lean desiccant chamber 22 by a liquid hold-back weir 24 and a liquid level control weir 26 appropriately disposed within the drum. The upper edge of liquid level control weir 26 is lower than the upper edge of liquid hold-back weir 28. Also included in upper reboiler drum 12 is an outlet for disengaged water vapors 28 and an outlet for water-lean desiccant 30, the utility of which will become evident in the subsequent description.

The lower drum 14 is an enclosed rectangular structure having an inlet for water-rich desiccant which fluidly communicates with the liquid-holding chamber 20 through conduit 32.

Turning now to FIG. 3, it can be seen that the lower drum 14 is interconnected to the central chamber of the upper drum by means of a plurality of open-ended riser conduits 34 which pass through the heating section 16 and protrude upwardly into central chamber 18. The riser conduits are appropriately sealed at the transversement thereof through a divider plate 36 which separates the heating section and the upper reboiler drum. To increase the magnitude of heat transfer, riser conduits 34 have received on the outer surface thereof a plurality of transverse juxtaposed fins of relative thin sheet stock. Positioned over the upper ends of each of the riser conduits are vapor caps 38. Central chamber 18 and bottom drum 14 are further interconnected by return conduits 40 which pass therebetween exterior of the heating section and whose upper ends are disposed within drum 12 at a level lower than the upper end of the riser conduits.

Looking now at FIG. 1 again, the heater section 16 encloses the riser conduits and embodies an inlet 42 for an exhaust gas stream received from a prime mover (not shown) and opposite the inlet an exhaust gas outlet 44 to which is affixed an exhaust stack 46. A butterfly control valve 48 situated within the exhaust stack serves as a damper to control the volume of exhaust gas flow through the heating section and in turn is controlled by a temperature sensing element appropriately mounted in central reboiler chamber 18. The butterfly control valve and associated temperature sensing element may require a bypass of all or part of the exhaust gas stream around the heating section. Such bypassing systems are commonly known in the industry and can be easily installed by one skilled in the art. Within the heating section adjacent inlet 42 is at least one diverter baffle 43 for distributing the hot exhaust gas stream uniformly around the length of the riser conduits.

Received over the disengaged water vapor outlet and secured to the reboiler drum is an upstanding elongated cylindrical distillation column 50 which embraces a vapor vent 52, a reflux condenser 54 section having an inlet and outlet, and a packed or tray section 56.

Directly below the bottom drum 14 is a surge tank 58 which rests upon feet 60 and which has disposed therein a heat exchange coil 62. The surge tank includes an inlet 64, one end of which communicates with the water-lean dessicant outlet 30 through conduit 66. At the opposite end of the surge tank is a water-lean dessicant exit connection 68 for returning water-lean dessicant to an external gas dehydration system. The inlet of the heat exchanger coil 62 is connected by conduit 70 to the outlet of the reflux condenser section 54 and the outlet thereof is connected by conduit 72 to the distillation column 50 at a point above a portion of the trayed section 56 such that desiccant flowing therein is discharged within the column over a portion of the trays.

The vessel 10 has received thereover a blanket of insulation 74 to retain the heat therein and consequently to increase the efficiency of the apparatus.

In operation, cool water-rich liquid desiccant 76 such as glycol, returning from an external process dehydration system enters the regeneration system at the inlet to the reflux condenser section 54 in the top of the distillation column 50. The liquid desiccant exits therefrom within conduit 70 and proceeds to enter and flow through heat exchanger coil 62 where the water-rich liquid desiccant receives heat from hot, water-lean, desiccant flowing countercurrently in the surge tank 58. The water-rich liquid dessicant progresses from the heat exchanger coil through conduit 72 into the distillation column where it flows downwardly through a portion of the trayed section 56 and enters the liquid-holding chamber 20 in the upper reboiler drum 12, from whence it proceeds downwardly through conduit 32 into bottom drum 14. The liquid desiccant then proceeds to and rises upwardly in the finned riser conduits 34 where heat is transferred thereto from a hot exhaust gas stream 78 in the heating section 16 until it is expelled from the upper end of the riser conduits into the main reboiler section 18.

Within the main reboiler section a natural convection type reboiling action takes place. That is, a portion of the desiccant is continually recirculated back to the bottom drum 14 through the return conduits 40 and up through the riser conduits 34 back into the main reboiler section where the liquid desiccant enters as a partial vapor and partial liquid stream. The vapor caps 38 installed over each of the riser conduits directs percolating liquid desiccant back down into the main reboiler section.

The water vapors disengaged from the liquid desiccant at the top of the riser conduit 34 ascend upwardly from the main reboiler section into the distillation column and pass through the trayed and reflux condenser sections thereof where a portion of the vapors are condensed to liquid reflux and the remaining vapors are vented to atmosphere through vent 52.

A stream of hot, water-lean, reconcentrated liquid desiccant is continuously displaced from the main reboiler section 18 over level control weir 26 and exits from the upper drum 12 through conduit 66 into surge tank 58, where the hot lean desiccant flows past the heating coil in a direction countercurrent to that of the flow of the cool, water-rich, liquid desiccant within the coil. In this manner heat is exchanged between the cool, water-rich, glycol within the coil and the hot, water-lean, desiccant in the surge tank. The water-lean liquid dessicant then exits from the regeneration system and returns to the external gas processing dehydration system.

Simultaneous with the heretofore discussed flow of the liquid desiccant, the stream of hot exhaust gases 78 coming from a prime mover enters the heating section 16 at the inlet thereof and is distributed around the outside of the finned riser conduits 34 by the diverter baffle 43 and the natural turbulence of the stream. Due to the heat differential between the hot exhaust gases and the water-rich liquid desiccant, heat is transferred to the desiccant within the riser conduits by convection over the finned metal surfaces and then by conduction and convection to the liquid desiccant inside the riser conduits. After giving up a portion of the heat, the exhaust gas stream proceeds to the atmosphere through the stack 46. As previously mentioned the temperature of the liquid desiccant is controlled by regulating the volume of flow of the hot gas stream by a temperature sensor located within the main reboiler section 18 which activates a butterfly control damper valve located within the exhaust stack.

During the description of the preferred embodiments specific language has been used for the sake of clarity. However, it is to be understood that the words used are not words of limitation and include all words which operate in a similar manner to accomplish a similar purpose.

What is claimed is:

1. A reboiler for reconcentrating liquid desiccant through utilization of exhaust gas from a prime mover comprising:

an enclosed upper reboiler drum having means to receive water-rich-desiccant, a first outlet for disengaged water vapors and a second outlet for substantially reconcentrated hot water-lean liquid desiccant, said means to receive remote from said second outlet;

an enclosed lower reboiler chamber;

a plurality of open-ended riser conduits located essentially between said means to receive and said second outlet each conduit having one end communicating with the interior of said lower reboiler chamber and having the other end protruding upwardly into said upper drum wherethrough liquid desiccant flows upwardly from said lower reboiler chamber into said upper reboiler drum;

at least one downcomer having one end communicating with the interior of said upper reboiler drum and with the other end communicating with the interior of said lower reboiler chamber to provide downward circulation of water-rich-liquid desiccant to said lower chamber as said desiccant moves to said second outlet;

a liquid level control weir positioned within said upper reboiler drum adjacent said second outlet to provide overflow of water-lean desiccant to said second outlet; and an enclosed heating section, said heating section being disposed between said upper drum and lower reboiler chamber and enveloping said riser conduit only, said heating section having an inlet and an outlet for exhaust gas flowing from said prime mover transversely across said riser conduit, whereby liquid desiccant flowing by convection within said riser conduit from said lower chamber, to said upper drum is indirectly heated by said exhaust gas to disengage water, as vapor therefrom; said vapor eventually passing through said first outlet.

2. An apparatus as in claim 1 including:

a distillation column disposed over said disengaged water vapor outlet; said distillation column having a stripping and rectifying portion for intermingling downwardly flowing water-rich liquid desiccant with said upwardly rising disengaged water vapors; said distillation column further including an outlet vent for said water vapors; and a hold back weir adjacent said means to receive having an upper edge at a higher level than the upper edge of said level control weir and being positioned within said upper reboiler drum so that means to receive forms a reservoir for receiving said water-rich liquid desiccant flowing downwardly from said distillation column; said reservoir being in fluid communication with said lower reboiler chamber via at least one of said downcomers.

3. An apparatus as in claim 1 including:
a multiplicity of fins transversely received on said riser conduit along the longitudinal length thereof for increasing the heat transfer area thereof.

4. An apparatus as in claim 1 including vapor caps disposed over the upper end of each of said riser conduits to direct percolating liquid desiccant down into said main section of said upper reboiler drum.

* * * * *